(12) United States Patent
Armangau et al.

(10) Patent No.: US 11,048,632 B2
(45) Date of Patent: Jun. 29, 2021

(54) DATA STORAGE SYSTEM WITH PERFORMANCE-BASED DISTRIBUTION OF I/O REQUESTS TO PROCESSING CORES

(71) Applicant: EMC IP Holding Company LLC, Hopkinton, MA (US)

(72) Inventors: Philippe Armangau, Acton, MA (US); Bruce E. Caram, Hudson, MA (US); Rustem Rafikov, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 16/398,432

(22) Filed: Apr. 30, 2019

(65) Prior Publication Data

US 2020/0349079 A1 Nov. 5, 2020

(51) Int. Cl.
*G06F 12/0831* (2016.01)
*G06F 13/20* (2006.01)
*G06F 9/38* (2018.01)
*G06F 9/48* (2006.01)
*G06F 9/50* (2006.01)

(52) U.S. Cl.
CPC ........ *G06F 12/0835* (2013.01); *G06F 9/3885* (2013.01); *G06F 13/20* (2013.01); *G06F 9/4881* (2013.01); *G06F 9/5033* (2013.01); *G06F 2209/503* (2013.01)

(58) Field of Classification Search
CPC .... G06F 12/0835; G06F 13/20; G06F 9/3885; G06F 9/4881; G06F 2209/503; G06F 9/5033
See application file for complete search history.

(56) References Cited

U.S. PATENT DOCUMENTS

| 7,689,998 B1* | 3/2010 | Chrysanthakopoulos ................... G06F 9/4881 718/104 |
|---|---|---|
| 8,122,158 B1 | 2/2012 | Kudva et al. |
| 8,402,172 B2 | 3/2013 | Muppirala et al. |
| 9,485,310 B1 | 11/2016 | Bono et al. |
| 2002/0107962 A1* | 8/2002 | Richter ............... H04L 41/0896 709/225 |
| 2005/0144332 A1* | 6/2005 | Nellitheertha ........ G06F 9/4881 710/15 |
| 2010/0325429 A1* | 12/2010 | Saha ................... H04L 63/0823 713/158 |

(Continued)

*Primary Examiner* — Meng Ai T An
*Assistant Examiner* — Michael W Ayers
(74) *Attorney, Agent, or Firm* — BainwoodHuang

(57) ABSTRACT

A method of assigning I/O requests to CPU cores of a data storage system includes, in a first operating mode, assigning I/O requests to CPU cores based on port affinity while maintaining a current I/O completion count, and regularly performing a first test-and-switch operation that includes (i) for a sample interval, temporarily assigning the I/O requests to the CPU cores based on core availability while obtaining a sample I/O completion count, (ii) comparing the first sample I/O completion count to the current I/O completion count, and (iii) based on the sample I/O completion count being greater than the current I/O completion count, switching to a second operating mode. In the second operating mode, I/O requests are assigned to the CPU cores based on core availability, and similar operations are performed for periodically testing whether to switch to the first operating mode.

12 Claims, 6 Drawing Sheets

(56) References Cited

U.S. PATENT DOCUMENTS

2014/0136808 A1    5/2014   Colgrove et al.
2014/0195708 A1*   7/2014   Klein .................... G06F 13/28
                                                        710/263
2020/0334183 A1*  10/2020   Wang ..................... G06F 9/542
2020/0387800 A1*  12/2020   Du .......................... G06N 3/10

* cited by examiner

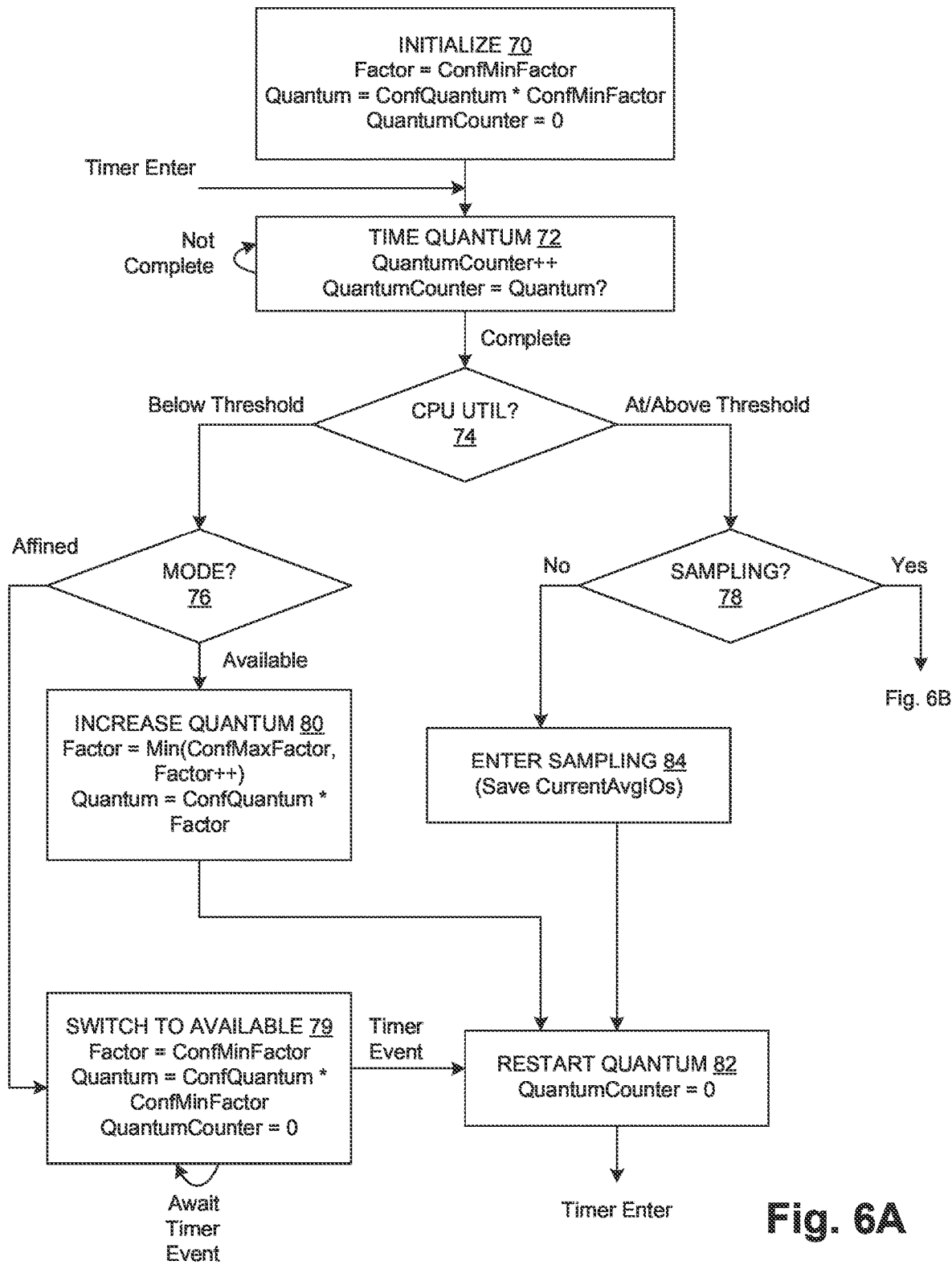

DATA STORAGE SYSTEM WITH PERFORMANCE-BASED DISTRIBUTION OF I/O REQUESTS TO PROCESSING CORES

BACKGROUND

The invention is related to the field of data storage systems, and in particular to techniques for managing the use of processing cores for processing I/O requests in a data storage system.

Modern data storage systems employ processing complexes that may include numerous processing cores, distributed among some number of multi-core CPU integrated circuits for example. Data storage systems typically also employ some number of front-end ports at which I/O requests are received from external requestors. Generally, a data storage system should effectively distribute the processing of received I/O requests among the processing cores, to achieve a desired combination of performance and efficient resource utilization.

SUMMARY

A technique is disclosed for assigning received I/O requests to processing cores in a manner that can provide for desired performance over a range of operating conditions. In particular, the technique can provide for efficient use of processing resources in order to handle a heavy workload effectively, while also providing for reduced latency and higher performance under lighter workloads when the efficiency constraint may be relaxed.

In particular, a method is disclosed of assigning I/O requests to CPU cores of a data storage system, where the I/O requests are received from external requestors via respective ports. The method includes, in a first operating mode, assigning the I/O requests to the CPU cores based on port affinity while maintaining a current I/O completion count, and regularly performing a first test-and-switch operation that includes (i) for a sample interval, temporarily assigning the I/O requests to the CPU cores based on core availability while obtaining a sample I/O completion count, (ii) comparing the first sample I/O completion count to the current I/O completion count, and (iii) based on the sample I/O completion count being greater than the current I/O completion count, switching to a second operating mode. In the second operating mode, I/O requests are assigned to the CPU cores based on core availability while maintaining the current I/O completion count, and a second test-and-switch operation is regularly performed that includes (i) for a sample interval, temporarily assigning the I/O requests to the CPU cores based on port affinity while obtaining the sample I/O completion count, (ii) comparing the sample I/O completion count to the current I/O completion count, and (iii) based on the sample I/O completion count being greater than the current I/O completion count, switching to the first operating mode.

By the above technique, the data storage system can persistently operate in the operating mode that delivers the best current performance, as measured by I/O completion rate. The port-affinity mode may be best suited for handling very heavy workloads, as the port-core affinity reduces cache thrashing and thus provides efficient use of processing resource. The core-availability mode may be better suited for lighter workloads, providing generally lower latency on a per-I/O-request basis and thus improving performance accordingly. The technique adapts to changing workloads through the use of the test-and-switch operations and resulting transitions between the operating modes.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 6A and 6B are flow diagrams of a more specific method of assigning I/O requests to cores according to one embodiment;

DETAILED DESCRIPTION

Figure 1:
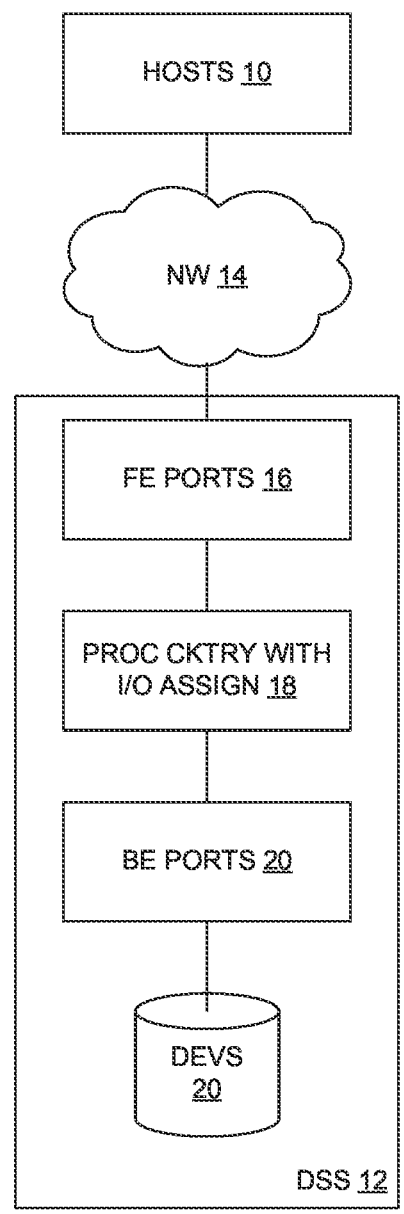
FIG. 1 is a block diagram of a data processing system including a data storage system employing a technique of assigning I/O requests to processing cores as described herein.

FIG. 1 shows a data processing system 10 in which a plurality of host computers (HOSTS) 10 access secondary storage provided by a data storage system (DSS) 12 via a network 14. As shown, the data storage system 12 includes front-end interface circuitry or ports (FE I/ORTS) 16, processing circuitry (PROC CKTRY) 18, back-end interface circuitry or ports (BE I/ORTS) 20 and secondary-storage devices (DEVs) 22. The processing circuitry 18 includes particular functionality for assigning I/O requests to processing cores, as described more herein.

In operation, the hosts 10 issue secondary storage data requests (reads, writes) for data stored on the devices 20. These requests are generally referred to as "I/O requests" herein. The I/O requests are communicated from the hosts 10 to respective ports 16 of the DSS 12 by the network 14. The processing circuitry 18 processes each I/O request and returns an appropriate response. In the case of reads, the response generally includes the requested data (absent a failure or other abnormal condition), and for writes the data is written to respective drives 20 and a "write complete" response is returned. The processing circuitry 18 may maintain and utilize a semiconductor "disk cache" to cache selected data of the drives 20, as generally known in the art. Thus read data may come from the cache (for a hit) or from a device 20 (cache miss). For a write, the write data may be stored into the cache initially, then later de-staged to a device 20.

Figure 2:
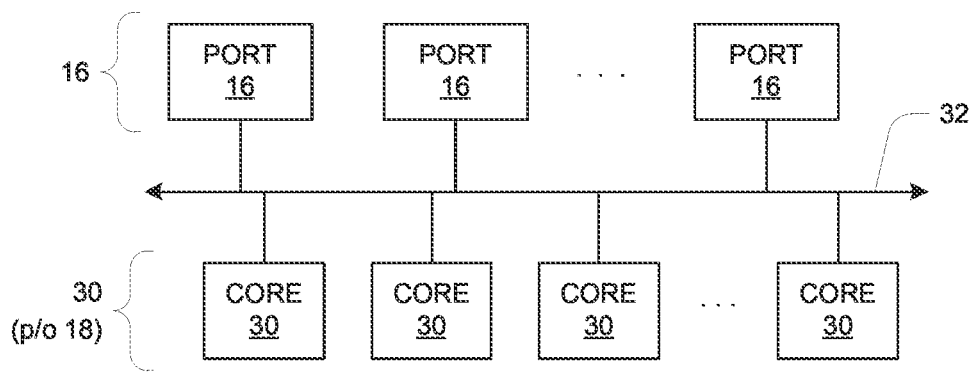
FIG. 2 is block diagram of a portion of the data storage system.

FIG. 2 illustrates certain details of the data storage system 12, specifically the FE ports 16 in relation to processing cores 30 that form part of (p/o) the processing circuitry 18. As shown, the ports 16 are coupled to the cores 30 by internal data interconnections 32, so that in general an I/O request received at any given port 16 can be delivered to any of the cores 30 for processing. As generally known in the art, each core 30 forms a single processing entity from the perspective of the operating software executing thereon. In modern processing arrangements, a single processor integrated circuit (IC) is typically a "multi-core" processor, meaning that it contains multiple cores and an arrangement of shared on-chip memory, and addition to a shared connection to off-chip memory and I/O devices. Thus, in a given implementation the cores 30 may be distributed among some number of processor ICs, which are further arranged on one or more higher-level assemblies such as printed circuit boards, etc. Operating software of the data storage system 12 is responsible for the allocation of processing tasks to the cores 30 and for coordinating the simultaneous operations of the cores 30 as they perform their respective tasks, as generally known in the art.

Figure 3:
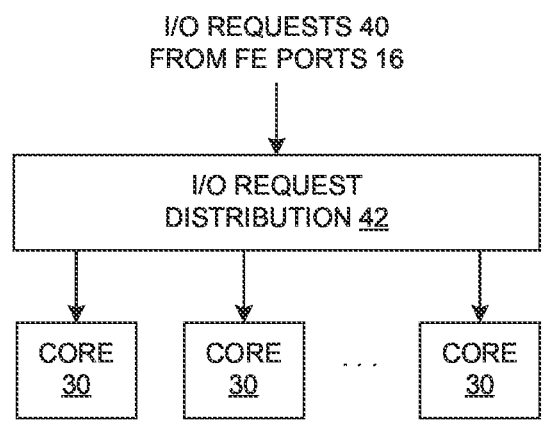
FIG. 3 is a schematic diagram of I/O request distribution in the data storage system.

FIG. 3 is a schematic illustration of one aspect of managing the use of the cores 30, which is the assignment of I/O requests 40 from the FE ports 16 to respective cores 30 for processing. This assignment task is performed by a functional component shown as I/O request distribution 42. Generally such a component will be formed by execution of certain operating software of the data storage system 12, which may be part of an operating system or other privileged component. In operation, the ports 16 signal receipt of I/O requests from the network 14, and the I/O request distribution 40 (realized within the processing circuitry 18) responds by assigning the I/O requests to respective cores 30 for processing.

Figures 4A, 4B:
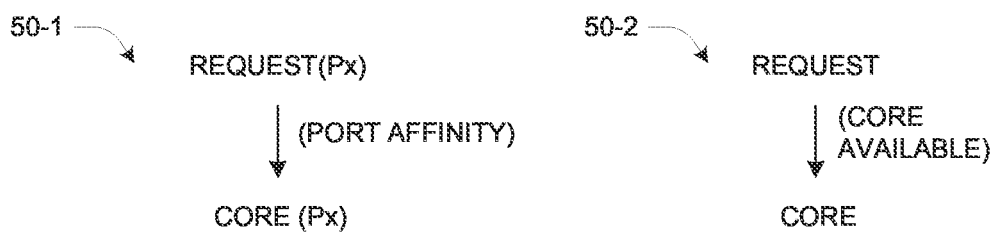
FIGS. 4A and 4B are schematic illustration of two separate modes of assigning I/O requests to cores in the data storage system.

FIGS. 4A and 4B illustrate two distinct manners or modes of operation of the I/O request distribution component 42 in assigning I/O requests 40 to the cores 30. A first mode 50-1, referred to as "Affined", is illustrated in FIG. 4A. A second mode 50-2, referred to as "Available", is illustrated in FIG. 4B. As described further below, the I/O request distribution component 42 actually switches between these two modes 50-1, 50-2 during operation in response to certain measures of performance.

Operating in the first mode 50-1, the I/O request distribution component 42 persistently associates ("affines") ports 16 with respective cores 30, and each request 40 received at a given port 16 is simply assigned to the affined core 30 for processing. In FIG. 4A, a request is indicated as being received from a particular port Px (shown as Request(Px)), and by the affinity the request is assigned to the core affined with that port (indicated as Core(Px)). The Affined mode 50-1 is generally suitable when the data storage system 12 is highly loaded, because this mode promotes efficient utilization of resources such as processor cache (reduced thrashing) and thus provides for overall high throughput, helping to meet the demand. For this reason the Affined mode 50-1 may also be referred to as a "batch" mode, referring to its efficient handling of a large batch-type workload.

Operating in the second mode 50-2, the I/O request distribution component 42 dynamically selects the cores 30 for processing the I/O requests 40 as they are received. This is indicated as "Core Available", i.e., a core is selected in part based on its current availability to accept a new request for processing. In a typical embodiment each core 30 may maintain a respective queue of I/O requests being processed by that core 30, and such a core is "available" if it has at least one empty queue spot. The cores 30 may be prioritized in some dynamic manner, such as "round robin" for example, to promote full utilization and load balancing. The Available mode 50-2 is generally suitable when the data storage system is more lightly loaded, because this mode promotes low latency of requests albeit at potentially reduced efficiency that may be tolerable at lighter load. Due to its dynamic selection of cores 30, the Available mode 50-2 may be referred to as a "round robin" mode, in contrast the "batch" mode 50-1.

Figure 5:
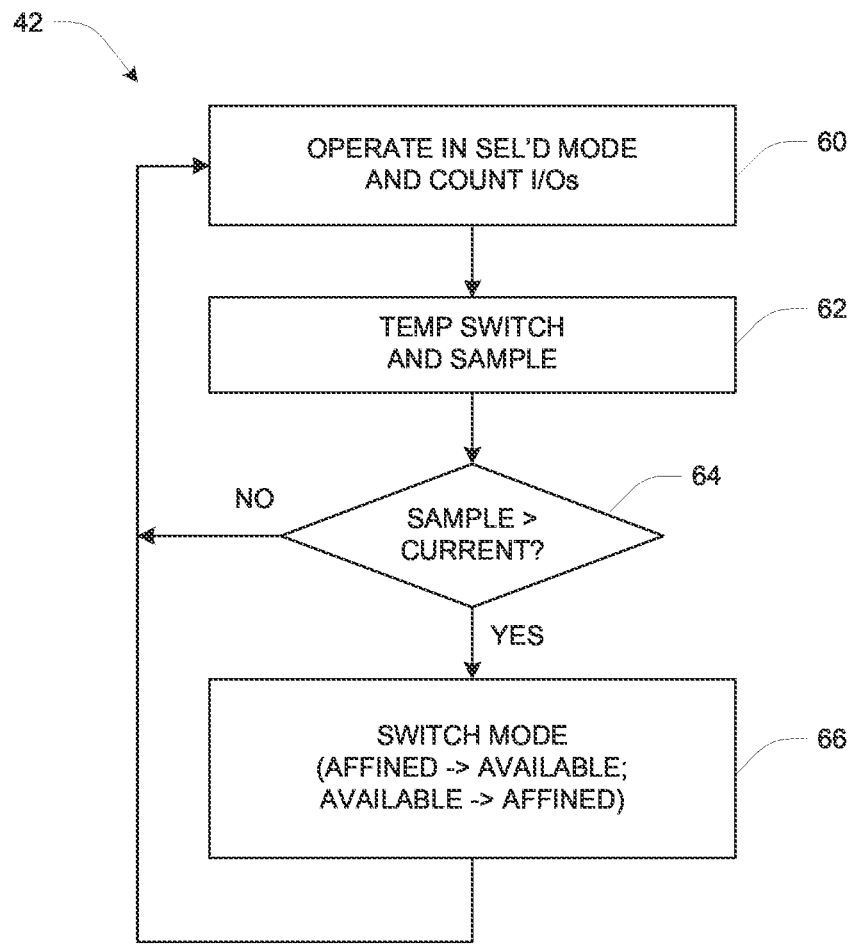
FIG. 5 is generalized flow diagram of a method of assigning I/O requests to cores.

FIG. 5 is a generalized depiction of operation of the I/O request distribution component 42. Generally, operation switches between the two modes 50-1, 50-2 according to operating conditions. A more detailed description of operation according to one specific embodiment is described further below.

At 60, the I/O request distribution component 42 operates in a selected one of the modes 50-1 or 50-2. The component 42 maintains a count of I/O requests that are processed, which is referred to as the "current" count. This is normalized in some manner, e.g. as an average over a predetermined interval such as a 1-second interval. As described more below, the duration of operation at 60 may be increased over time, reducing the impact of the testing and conditional switching that occurs in other operating states.

At 62, the I/O request distribution component 42 temporarily switches to the other operating mode (i.e., from 50-1 to 50-2, or vice-versa) and operates for a short sample interval, such as 1 second for example. During this period it obtains a separate count of I/O requests that are processed during this interval, which is labeled as a 'sample" count.

At 64, the I/O request distribution component 42 compares the sample count to the current count. If the sample count is not larger than the current count, then the I/O request distribution component 42 reverts back to the current mode (the one used at 60, prior to the switch for sampling) and then loops back to 60 to continue operation in the current mode for an additional period. As mentioned and as described more below, the duration of operation at 60 may be increased over successive iterations. If at 64 the sample count is larger than the current count, then at 66 the operating mode is switched (i.e., from Affined 50-1 to Available 50-2, or vice-versa) and then operation loops back to 60. As described more below, if the technique of gradually increasing the duration of operation at 60 is used, then in the transition from 66 to 60 the controlling values are preferably reset so that the gradual increasing resumes for the new operating mode.

Another possible feature, also described more below, is the use of hysteresis in the test at 64. Thus, it may be required that the sample count exceed the current count by some small value, e.g., 10%, in order to minimize disruptive transitory mode-switching. Such hysteresis may be applied in both directions or only one. In one embodiment, such hysteresis may be used only for the transition from Affined to Available and only when writes are occurring. Writes exhibit a staccato or "spiky" nature that is better handling in Affined mode, so when writes are occurring it may be preferred to require a larger improvement in I/O rate to justify a switch to Available mode.

To summarize the method of FIG. 5, it regularly switches between Affined and Available modes of assigning I/O requests 40 to the cores 30 based on operating conditions. All operations occur in each mode, potentially with certain mode-specific differences as mentioned above and described below. The test at 64 and switch at 66 constitute a test-and-switch operation that effects the transition between modes in both directions, i.e., from Affined to Available and from Available to Affined, based on a performance improvement that is sensed by comparing a current I/O count to a sample I/O count obtained in a brief sampling interval of operation in the other operating mode.

Figure 6B:
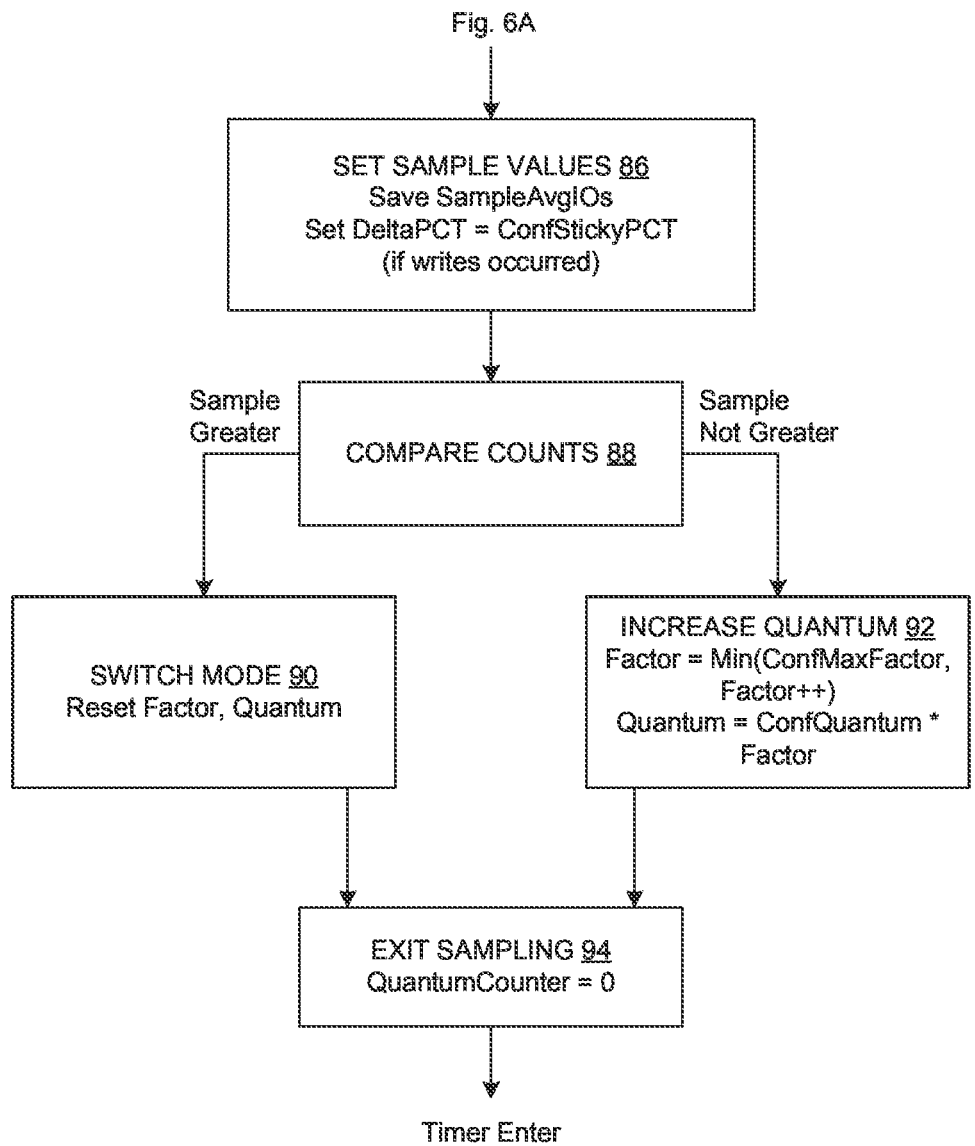

FIGS. 6A and 6B illustrate a more detailed example of the general method of FIG. 5. This example employs certain variables, some of which are provided with configured values such as by an administrative user or simply set up as defaults in some manner. In this description, the term "quantum" describes a period of operation in a given mode before the test-and-switch operation is performed. This period is defined as an integral number (Quantum) of fixed-size intervals, such as ½- or 1-second intervals. Variables used in the method of FIGS. 6A and 6B include the following:

Quantum—The integral number of fixed-size intervals in the current quantum of operation before switching to "Sampling" mode.

Factor—A multiplier applied to a configured value ConfQuantum (below) to calculate a Quantum to be used next if the system decides to stay in the current mode after sampling ConfMinFactor—A configured minimum value for Factor ConfMaxFactor—A configured maximum value for Factor ConfQuantum—A configured minimum quantum value (e.g., 20 intervals in the system)

ConfBatchStickyPct—A hysteresis-producing value, being a percent that the Available I/O count should be better than the Affined I/O count to switch to Available mode. This may be applied only when Write I/O requests are detected during a quantum, because contribute to spikiness in the I/O requests DeltaPct—Equal to ConfBatchStickyPct if Writes happened, otherwise zero QuantumCounter—Current quantum from the start of the mode ConfCpuBusyThreshold—A threshold value for CPU utilization, represented as a percentage In one embodiment, all I/O requests including those generated by internal operations of the data storage system 12 (i.e., not just host I/O requests) are taken into account reads, writes, and internal I/Os generated. Internal I/Os may be counted as a group of I/Os. The counting of internal I/Os may be tunable in some manner.

Referring to FIGS. 6A and 6B, operation begins with an initialization 70 in which the value of Factor is set to ConfMinFactor, Quantum is set to ConfQuantum*ConfMinFactor, and a QuantumCounter is initialized to zero. Operation proceeds to 72 to measure the passage of the current quantum by counting a number of successive operating intervals (e.g., 1-second intervals). This is represented by the incrementing of QuantumCounter and test against Quantum. As an example, if Quantum currently has a value of 20, then operation continues for 20 successive intervals (e.g., 20 seconds).

Once the quantum of 72 is complete, operation proceeds to 74 where CPU utilization is tested. If it is below threshold then operation proceeds to 76, and otherwise to 78. At 76, further operation depends on the current mode. If the system is currently in Affined mode, then operation continues from 79 as described further below. If at 76 the system is operating in the Available mode, then at 80 the Quantum is increased by first increasing Factor and then setting Quantum to the product of ConfQuantum and the increased Factor. Then at 82 a new quantum is started. The QuantumCounter is reset to zero, then operation is repeated from 72 by a path shown as "Timer Enter".

If at 76 the system is operating in the Affined mode, then at 79 operation switches to Available mode along with resetting the variables and counters. The general idea is for the system to be in Available mode if CPU utilization is less than the threshold. Also at 79, the system awaits a next timer event before proceeding to the quantum restart at 82 and continued operation as described above.

Returning to the "above threshold" path from 74, at 78 it is determined whether the current quantum is a sample quantum, and if so then operation continues as shown in FIG. 6B and described below. If operation is in a regular, non-sampling quantum, then at 84 and 82 the system initiates the sample quantum, saving the current I/O count as CurrentAvgIOs. It will be appreciated that once this sample quantum completes, the test at 78 will initiate the additional processing of FIG. 6B, now described.

Turning now to FIG. 6B, operation at 86 is entered from the sampling step 78 of FIG. 6A. Here, sample values are set in preparation for a subsequent test. The count of I/Os in the sample quantum is saved as SampleAvgIOs. Also, if writes occurred, then DeltaPct is set to ConfBatchStickyPct (and is otherwise cleared to zero).

At 88, the sample-quantum I/O count SampleAvgIOs is compared to the previously saved current I/O count CurrentAvgIOs. If the sample count is sufficiently greater, then operation proceeds to step 90 in which the operating mode is switched, and otherwise operation proceeds to 92. The test for a sufficiently greater sample count is slightly more complicated than just a straight comparison. If the current mode is Available, then the test is simply whether the sample count is greater than the current count, and if so then the mode is switched to Affined at 90. If the current mode is Affined, however, then the sample count must exceed the current count by the value of DeltaPCT in order to switch modes. As explained above, this value is set to the cnon-zero ConfStickyPCT value if writes have occurred in the interval. The effect of this test, then, is to only switch from Affined to Available if the sample count (obtained during temporary Available operation) exceeds the current count (in Affined mode) by at least this non-zero ConfStickyPCT value. The further effect is to prefer remaining in the Affined mode in the presence of writes, because otherwise the variability of the writes may result in unnecessary mode switching.

At 90, based on the sample-quantum count being greater, the operating mode is switched. Thus, if prior to the sample quantum the system was operating in Affined mode 50-1, then the mode is switched to the Available mode 50-2, and vice-versa. Also, Factor and Quantum are reset to their initial values. At 94, the sample quantum is exited, including a reset of QuantumCounter to zero, and operation iterates via the Timer Enter path.

If at 88 the sample-quantum count is not greater than the current-mode count, then operation is to continue in the current mode. At 92, the quantum is increased by first incrementing Factor and then setting Quantum to the product of ConfQuantum and the increased Factor. Then sampling is exited at 94 and operation is iterated via the Timer Enter path.

Figure 7:
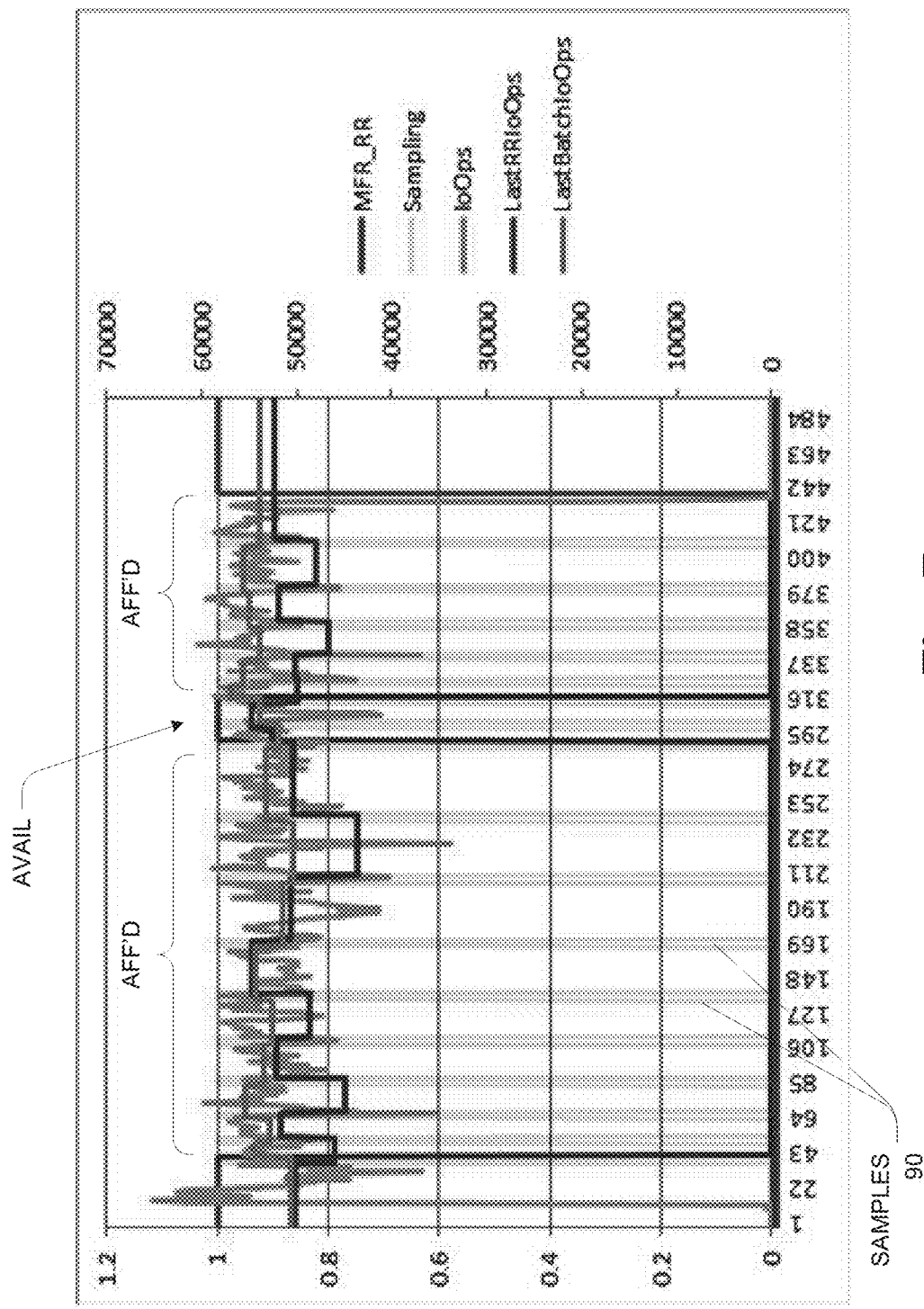
FIG. 7 is a plot illustrating a result of the use of the disclosed technique for an example workload.

FIG. 7 is a plot illustrating performance of the presently disclosed technique. Time is indicated on the horizontal axis. The right vertical axis represents number of I/Os, and the left vertical axis represents the operating mode as either 0 (Affined) or 1 (Available). The values plotted are the instantaneous actual I/O rate (spiky line ranging from about 35000 to about 65000) and the per-mode I/O counts "LastRRIoOps" for Available and LastBatchIoOps for Affined. Also shown are pulses 90 representing sample quantums. This example is for a hypothetical workload of 8K I/Os in a pattern of 4 reads followed by 1 write.

1. Operation starts in the Available mode 50-2 (MFR_RR=1)

2. At time 43 operation switches to Affined mode 50-1 and continues for several quantums of gradually increasing durations, as indicated by the increasing spacing of the samples 90.
3. The switch at 43 is based on LastBatchIoOps>LastRRIoOps
4. Operation in Affined continues for a quantum until a next sampling (at about 50) when it switches to Available mode for a single sampling quantum
5. At 50, the sampled LastRRIoOps<LastBatchIoOps=>stay in the same mode
6. Operation continues in Affined mode for (quantum"*multiplier) until next sampling
7. Such operation continues for several quantums of increasing duration
8. Note the behavior between 127 and 148. LastRRIoOps is a bit higher than LastBatchIoOps but the system nonetheless stays in Affined mode due to the effect of DeltaPct
9. At about 295, the system switches to Available briefly, then returns to Affined at about 316

While various embodiments of the invention have been particularly shown and described, it will be understood by those skilled in the art that various changes in form and details may be made therein without departing from the scope of the invention as defined by the appended claims.

What is claimed is:

1. A method of assigning I/O requests to CPU cores of a data storage system, the data storage system having a plurality of ports at which the I/O requests are received, comprising:
   in a first operating mode, assigning the I/O requests received at the plurality of ports to the CPU cores based on port affinity while obtaining a first current I/O completion count of I/O requests processed by the data storage system during a first fixed interval of a predetermined duration, wherein assigning based on port affinity comprises assigning an I/O request received at a given port to a corresponding CPU core associated with that given port, and regularly performing a first test-and-switch operation including (i) for a first sample interval of the predetermined duration, temporarily assigning the I/O requests to the CPU cores based on core availability while obtaining a first sample I/O completion count, and (ii) comparing the first sample I/O completion count to the first current I/O completion count to determine that the first sample I/O completion count is greater than the first current I/O completion count;
   responsive to determining that the first sample I/O completion count is greater than the first current I/O completion count in the first operating mode, switching to a second operating mode;
   in the second operating mode, assigning the I/O requests received at the plurality of ports to the CPU cores based on core availability while obtaining a second current I/O completion count of I/O requests processed by the data storage system during a second fixed interval of the predetermined duration, wherein assigning based on core availability comprises assigning an I/O request received at a given port to a currently available CPU core, and regularly performing a second test-and-switch operation including (i) for a second sample interval of the predetermined duration, the second sample interval being different from the first sample interval, temporarily assigning the I/O requests to the CPU cores based on port affinity while obtaining a second sample I/O completion count, and (ii) comparing the second sample I/O completion count to the second current I/O completion count to determine that the second sample I/O completion count is greater than the current I/O completion count; and
   responsive to determining that the second sample I/O completion count is greater than the second current I/O completion count in the second operating mode, switching to the first operating mode.

2. The method of claim 1, wherein each of the first and second operating modes includes a respective quantum period of operation during which the respective current I/O completion count is obtained as an average per-fixed-interval value, the quantum period being an integral number of the fixed intervals.

3. The method of claim 2, wherein the integral number is a variable number that increases over multiple successive quantums of operation in the respective operating mode before a respective test-and-switch operation results in switching to the other operating mode.

4. The method of claim 1, wherein at least one of the first and second test-and-switch operations employs a percentage threshold amount by which the respective sample I/O completion count must exceed the respective current I/O completion count to result in switching the operating mode.

5. The method of claim 4, wherein only the first test-and-switch operation employs the percentage threshold, thereby remaining in the first operating mode even when the first sample I/O completion count for core-availability assignment exceeds the first current I/O completion count for port-affinity assignment by less than the percentage threshold.

6. The method of claim 5, wherein the first test-and-switch operation employs the percentage threshold only when one or more write I/O requests have been processed during the first operating mode.

7. A data storage system comprising secondary storage devices, front-end ports for coupling to a network to receive host I/O requests, processing circuitry including a plurality of processing cores, and back-end ports coupling the processing circuitry to the secondary storage devices, the processing circuitry being configured and operative to execute operating software to perform a method of assigning the I/O requests to the processing cores, the method including:
   in a first operating mode, assigning the I/O requests to the cores based on port affinity while obtaining a first current I/O completion count of I/O requests processed by the data storage system during a first fixed interval of a predetermined duration, wherein assigning based on port affinity comprises assigning an I/O request received at a given port to a corresponding CPU core associated with that given port, and regularly performing a first test-and-switch operation including (i) for a first sample interval of the predetermined duration, temporarily assigning the I/O requests to the cores based on core availability while obtaining a first sample I/O completion count, and (ii) comparing the first sample I/O completion count to the first current I/O completion count to determine that the first sample I/O completion count is greater than the first current I/O completion count; responsive to determining that the first sample I/O completion count is greater than the first current I/O completion count in the first operating mode, switching to a second operating mode;
   in the second operating mode, assigning the I/O requests to the cores based on core availability while obtaining a second current I/O completion count of I/O requests processed by the data storage system during a second fixed interval of the predetermined duration, wherein assigning based on core availability comprises assigning an I/O request received at a given port to a currently available CPU core, and regularly performing a second test-and-switch operation including (i) for a second sample interval of the predetermined duration, the second sample interval being different from the first sample interval, temporarily assigning the I/O requests to the cores based on port affinity while obtaining a second sample I/O completion count, and (ii) comparing the second sample I/O completion count to the second current I/O completion count to determine that the second sample I/O completion count is greater than the second current I/O completion count; and responsive to determining that the second sample I/O completion count is greater than the second current I/O completion count in the second operating mode, switching to the first operating mode.

8. The data storage system of claim 7, wherein each of the first and second operating modes includes a respective quantum period of operation during which the respective current I/O completion count is obtained as an average per-fixed-interval value, the quantum period being an integral number of predefined fixed intervals.

9. The data storage system of claim 8, wherein the integral number is a variable number that increases over multiple successive quantums of operation in the respective operating mode before a respective test-and-switch operation results in switching to the other operating mode.

10. The data storage system of claim 7, wherein either or both of the test-and-switch operations employ a percentage threshold amount by which the respective sample I/O completion count must exceed the respective current I/O completion count to result in switching the operating mode.

11. The data storage system of claim 10, wherein only the first test-and-switch operation employs the percentage threshold, thereby remaining in the first operating mode even when the first sample I/O completion count for core-availability assignment exceeds the first current I/O completion count for port-affinity assignment by less than the percentage threshold.

12. The data storage system of claim 11, wherein the first test-and-switch operation employs the percentage threshold only when one or more write I/O requests have been processed during the first operating mode.

* * * * *